United States Patent [19]

Adler

[11] 4,063,764
[45] Dec. 20, 1977

[54] FOOT OPERATED LATCH FOR HOPPER CARS

[75] Inventor: Franklin P. Adler, Michigan City, Ind.

[73] Assignee: Pullman Incorporated, Chicago, Ill.

[21] Appl. No.: 705,841

[22] Filed: July 15, 1976

[51] Int. Cl.² .................................................. E05C 3/04
[52] U.S. Cl. ............................ 292/256.5; 292/DIG. 4
[58] Field of Search ................ 292/256.5, 210, DIG. 4

[56] References Cited

U.S. PATENT DOCUMENTS

| 1,338,052 | 4/1920 | Voight | 292/DIG. 4 |
| 3,041,099 | 6/1962 | Stewart et al. | 292/259 |
| 3,804,026 | 4/1974 | McNally | 292/210 X |

Primary Examiner—Richard E. Moore
Attorney, Agent, or Firm—Thomas G. Anderson

[57] ABSTRACT

A latch mechanism for hatch covers utilized on railway hopper cars comprises a hand or foot operated latch arm which is held in a closed position by a balanced retaining member pivotally mounted on a keeper element. The retaining member includes a nose engaging latch arm for retaining the same in a closed position. The retaining member also includes a foot element disposed below the arm. Sudden downward movement of the arm within the keeper element against the foot element causes the balanced retainer to be swung to an out-of-the-way position whereupon the arm can be unlatched from the keeper.

14 Claims, 4 Drawing Figures

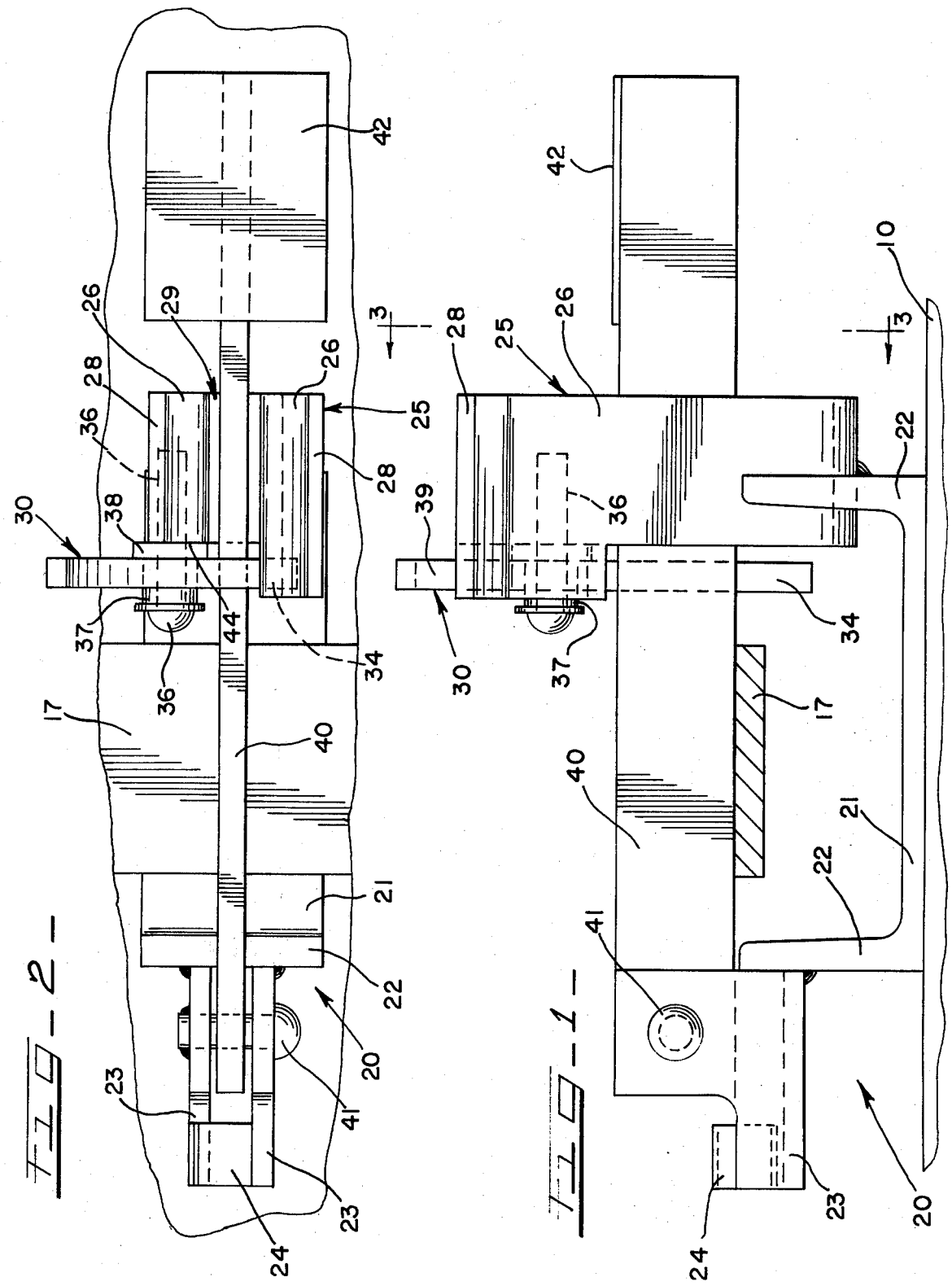

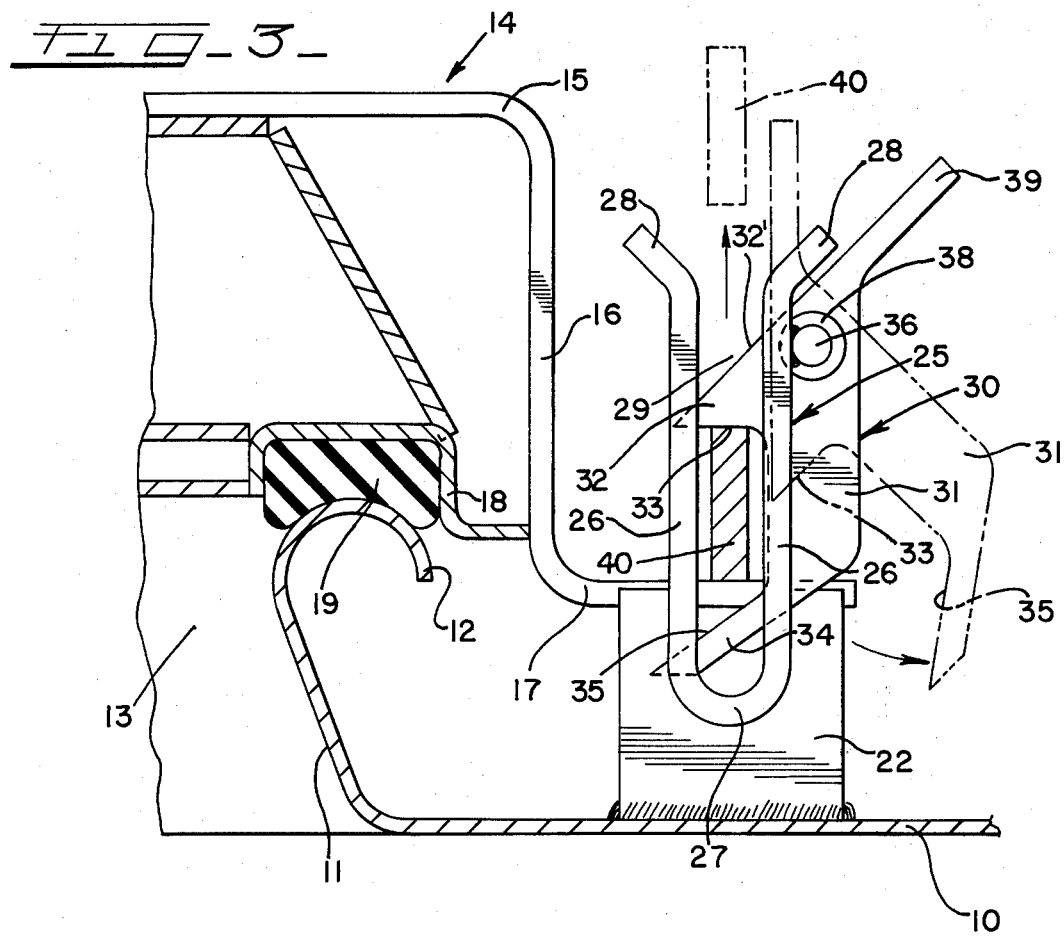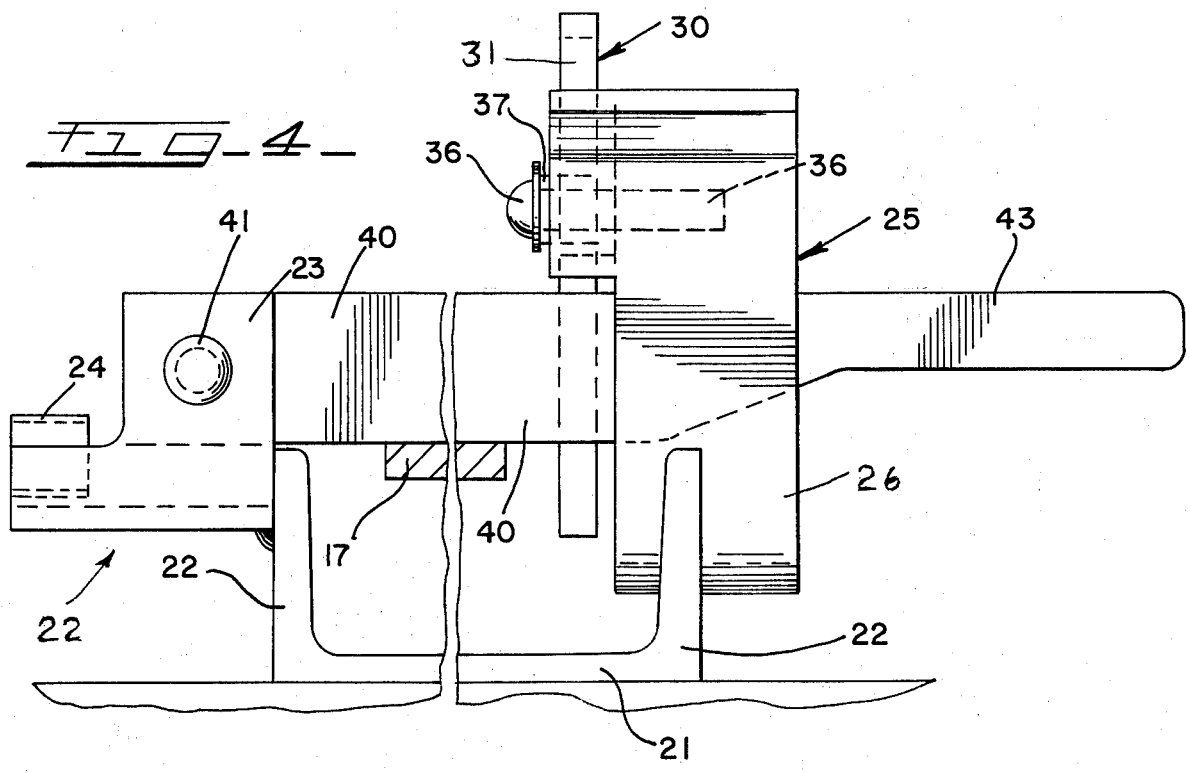

FOOT OPERATED LATCH FOR HOPPER CARS

FIELD OF THE INVENTION

The broad field of invention pertains to railway hopper cars. More specifically, the present invention relates to a latch mechanism for latching roof mounted hatch cover over a hatch opening.

DESCRIPTION OF THE PRIOR ART

The prior art includes U.S. Pat. Nos. 2,583,053 Jan. 22, 1952, U.S. Pat. No. 3,041,099 June 26, 1962 U.S. Pat. No. 3,145,665 Aug. 25, 1964, U.S. Pat. No. 3,307,498 Mar. 7, 1967, U.S. Pat. No. 3,707,306 Dec. 26, 1972 and U.S. Pat. No. 3,848,912 Nov. 19, 1974. The present invention is an improvement over the structure disclosed in the aforementioned patents.

SUMMARY

In the present invention a roof mounted hatch cover is removably positioned over a hatch opening and includes a strap having a flanged distal portion extending to one side of the opening. A latch mechanism on the roof adjacent the distal flange portion of the strap includes a keeper having a vertically extending recess. A latch arm is pivotally mounted on the hopper car roof and is hingedly movable over the distal end portion into the keeper for latching the latch cover in a closed position. A retainer element is pivotally mounted on the keeper and includes a nose portion and a foot portion extending laterally outwardly from the body in a direction toward the hatch opening. The foot portion in the closed position of the retaining member is seated on top of the latch arm to retain the same within the keeper. The foot of the retaining member is disposed below the latch arm and includes an inclined cam surface. The retaining member is balanced so that when the operator sharply pushes downwardly on the latch arm, the lower face of the latch arm engages the camming surface and thereby rotates the keeper and the nose element upwardly into disengaging position relative to the latch arm whereupon the operator then can manually raise the latch arm to its release or open position. Because of the balanced mounting of the keeper, it then returns to its normal engageable position whereupon the latch arm can again be moved into retaining relation within the keeper. The retainer member also includes handle means whereby the operator can manually move the same between its open and closed position.

BRIEF DESCRIPTION OF THE DRAWINGS

FIG. 1 is a side elevational view of a latching mechanism positioned on a railway hopper car roof;

FIG. 2 is a plan view of the latching mechanism disclosed in FIG. 1;

FIG. 3 is a sectional view taken substantially along the line 3—3 of FIG. 1; and FIG. 4 is a side elevational view similar to FIG. 1 showing another modification of the invention.

DESCRIPTION OF THE PREFERRED EMBODIMENT

Referring particularly to FIG. 1 and 3 a hopper car roof 10 is provided with conventional upwardly extending coaming 11 having a curved flange 12 defining a hatch opening 13 in the roof 10. A portion of a hatch cover is designated at 14 and has abutment means that includes a strap 15 which with the hatch cover 14 is suitably pivotally connected to the hopper car roof 10. The strap 15 includes a vertical portion 16 which is integral with an outwardly or laterally extending flat distal latching portion 17. The hatch cover 14 includes a suitable flange structure 18 within which a rubber type seal 19 is secured to engage the curved flange 12 in sealing relation in the closed position of the hatch cover as best shown in FIG. 3. A latching mechanism includes a latch support bracket 20 positioned to one side of the hatch opening 13 on the car roof 10. The support bracket 20 includes a channel shaped support 21 secured to the roof 10 and includes upwardly extending flanges 22. A pair of hinge ears 23 are suitably connected to one of the flanges 22 and extend outwardly with respect thereto. The hinge ears 23 also have connected thereto a stop or lever support 24. A keeper or guide generally designated at 25 is also secured to one of the flanges 22 of the support 21. The keeper 25 comprises a pair of vertical guide plates 26 integral at their lower ends with an arcuate bight portion 27. The vertical guide plates or legs 26 are provided at their upper ends with sloping guide flanges 28 which extend into a recess 29 within the keeper 25. A jaw shaped latch arm retainer 30 as best shown in FIG. 3 includes a vertical relatively narrow body 31 provided with an outwardly or laterally projecting nose 32 having a latch arm engaging underneath surface or catch 33 and upper cam face 32'. The body 31 is also provided at its lower end with a laterally extending foot or lower jaw cam member 34 extending in the same direction generally as the nose 32 and also includes an inclined camming surface 35. As shown in FIG. 3 the inclined camming surface 35 is disposed below a latch arm or lever 40 held in position by means of the latch arm engaging surface 33 of the nose 32. A pivot pin 36 is secured to the outermost vertical guide plate 26 as shown in FIG. 3. The pivot pin 36 supports for rotation thereon a sleeve 37 extending through the body 31 of the latch arm retainer 30. As best shown in FIG. 2, a spacer 38 also is carried on the pin 36 the said spacer 38 bearing against a recessed or cut-out wall portion 44 of the outer guide plate 26. Thus the latch arm retainer 30 is pivotally supported on the keeper 25. The retainer 30 also is provided at its upper end with a handle 39 extending outwardly from the body 31. The latch arm or lever 40 has one end disposed between the hinge ears 23 and is hingedly connected thereto by means of a hinge pin 41 as best shown in FIGS. 1 and 2. The latch arm 40 is also provided at one end with a foot plate 42. In the modification shown in FIG. 4 the latch arm 40 is provided with a handle 43 for manual operation by an operator.

OPERATION

In the closed position of the hatch cover 14 as shown in FIG. 3, the hatch opening is closed and the latch arm 40 is disposed on top of the distal flange portion 17 for maintaining the hatch cover in the closed position. The latch arm is prevented against upward movement by means of the nose 32 of the retainer 30 which has its engaging surface disposed on top of the latch arm 40. The foot 34 of the retainer 30 is disposed below the latch arm 40 and upward movement of the latch arm 40 is restrained. In order to release the latch arm 40 to the operator merely handgrasps the handle places his foot on the foot plate 42 and with a sharp or rapid downward movement of his hand or foot causes the latch arm 40 to move downwardly. Since the foot 34 and the camming surface 35 is in the path of downward travel of the arm 40 the lower end of the arm 40 engages the camming surface 35 and swings the retainer 30 to the dotted line position shown in FIG. 3. The latch retainer 30 is so balanced that the swinging movement outwardly of the retainer 30 is sudden and the return gravitational movement of the retainer 30 to its original position is relatively slower. Thus before the retainer 30 can resume the locking position, the arm 40 is moved outwardly from the recess 29 to the dotted line position shown in FIG. 3. whereupon the arm 40 can now be pivoted to a position where it lies on the support stop 24, in a completely open position. Thus the hatch cover can now be raised to expose the hatch opening 13. The retainer 30 has now returned to its locking position shown in full lines in FIG. 3 and when the latch arm 40 again is lowered down into the recess it engages the inclined upper surface 32 of the nose 32 again pivoting the retainer 30 to the dotted line position whereupon the arm 40 is lowered on top of the distal flange 17 and the retainer then returns to its locking position on top of the arm 40.

By virtue of the balanced mounting of the retainer therefore the operator can quickly and easily open the latch mechanism by merely pressing sharply downwardly on the handle 43 or the footplate 42 to provide quick opening of the latch arm when desired. The handle 39 also permits the operator if he so desires to manually operate and move the retainer 30 beween its various positions.

Thus it is believed that a new and effective latch mechanism has been disclosed which will provide for the positive and quick release and locking of a hatch cover over a hatch opening.

The foregoing description and drawings merely explain and illustrate the invention and the invention is not limited thereto, except insofar as the appendent claims are so limited, as those skilled in the art, who have the disclosure before them will be able to make modifications and variations therein without departing from the scope of the invention.

What is claimed is:

1. In a hopper car having a hatch access opening;
a hatch cover movably supported on said car for opening and closing said access opening,
a latch strap on said cover having a latching portion projecting laterally to one side of said opening, the improvement comprising a latch mechanism including:
a latch support bracket mounted on said hopper car,
a latch arm hinged to said support for swinging movement about a generally horizontal axis over and off said latching portion when the latter is positioned generally horizontally attendant to the hatch cover being closed,
a keeper fixed to the hopper car and having a guide positioned alongside said latch arm,
a gravity-actuated retainer hung from said guide and swingable transversely through the path of movement of said latch arm and having a jaw adapted to receive said arm therein in the latched position of said mechanism,
said jaw having an upper jaw member defining a catch adapted to engage the upper edge of said latching arm and having a lower jaw member defining a cam extending in the latched position beneath said arm and operative to swing said retainer including said catch out of the path of movement of the arm upon said arm being biased against said cam to a position that the arm may be quickly raised past the catch before said retainer swings to latching position.

2. The invention according to claim 1, wherein said retainer has an upper cam face positionable against one side of the arm during release movement to maintain said retainer in released position.

3. The invention according to claim 2, wherein in the statically hung position of the retainer said upper cam face is disposed at an acute angle toward the plane of movement of the arm whereby said arm in being moved from unlatched to latching position is caused to engage said upper cam face and swing said retainer out of the path of movement of the retainer until said arm clears said catch whereupon said retainer is accommodated swinging movement toward said arm to admit the same within said jaw.

4. The invention according to claim 1, wherein said lower jaw member cam comprises an upper camming surface sloping in the latched positions of the arm downwardly beneath said arm for engagement by the lower side thereof.

5. The invention according to claim 1, wherein said cam on the lower jaw is proportioned to cause said retainer to swing to a position disposing said upper cam face vertically at one side of said arm a distance to allow the arm to rise above the catch prior to said retainer swinging toward said arm.

6. In a hopper car having an upper hatch opening, a hatch cover movably supported on said car for uncovering and closing said opening, a latch mechanism for the cover comprising a strap connected to the cover and extending outwardly therefrom an positionable generally horizontally in the closed position of the cover,
a latch arm swingably mounted on the car on a generally horizontal axis for vertical swinging movement over the strap in a latching position and off to one side of the strap in release position,
a retainer mounted on the car for swinging movement transversely of the arm and having retaining means for lockingly-receiving and retaining the arm in latched position,
said retainer having means for releasing the arm upon said arm being biased downwardly from the latched position to disengage the retainer from the arm and position the same in release position at one side out of the path of movement of the arm, and
said retainer having cam means for engaging a side of the arm during uplifting movement of the arm after said retainer has been disposed in said release position to prevent said retainer from returning to latching position with the arm and said last mentioned means being positionable in the path of movement of the arm from release to latching position and operative to engage with the underside of the arm and cause said retainer to swing out of said path until said arm is located beneath the last mentioned means whereupon said retainer is free to swing to a position in interengaging latching relation with said arm.

7. The invention according to claim 6, and
a keeper associated with said retainer means comprising guide means for guiding said arm with respect to said retainer means and maintaining said arm in cooperative relationship with said retainer means.

8. The invention according to claim 7, said guide means being of U-shape having a pair of legs defining an upwardly open slot accommodating ingress and egress of said arm, and said retainer having an upper portion pivotally supported on one of said legs and being gravitationally biased to swing across said slot.

9. The invention according to claim 6, and yieldable means biasing said arm upwardly for engagement with said retaining means, the axis of pivot of said retaining means being disposed at one side of the arm and effective to cause said retainer to be urged toward said arm attendant to the arm being yieldingly pressed upwardly against said retainer means.

10. The invention according to claim 9, and said retainer means comprising a handle portion for manual operation thereof between release and locking positions.

11. In a car hopper cover latching mechanism of the type wherein the cover is lifted to open a hatch and lowered to close the hatch, a latching mechanism for the cover comprising abutment means on the cover, an arm pivotally supported for movement onto and off said abutment means, Retainer means swingably supported for movement laterally of the arm to latching and release position with respect to the arm, said retainer means having an upper catch portion and a lower cam portion, said portions defining a jaw therebetween for receiving said arm therein, said catch portion presenting a lower catch surface positionable in latched position over the arm and said lower portion presenting an upwardly facing cam face sloping in the latched position beneath said arm out of contact therewith and engageable with the arm upon said arm being depressed thereagainst preparatory to release for swinging said retainer means laterally away from the arm to a position allowing the arm to be rapidly elevated during the lag period before the retainer means swings back to retaining position, and said retainer means having a cam face above said catch portion disposed to be positioned during said lag period alongside said arm for lateral engagement therewith to prevent return movement of said retainer means during release movement of the arm.

12. The invention according to claim 11, and a keeper having a pair of legs defining an arm-admitting slot therebetween and providing guide surface for flanking said arm and guiding the same during exit and entry with respect to the slot, and means swingably mounting said retainer means from one of said legs.

13. The invention according to claim 12, wherein said legs comprise upwardly diverging guide end portions.

14. The invention according to claim 11, wherein said cover has a resilient sealing element thereabout adapted to be compressed in closed position of the cover for biasing the cover to open position whereby urging the arm against said catch portion in the latched position of the retainer and operative to rapidly lift the arm past the catch when the retainer means is disposed in release position.

* * * * *